(12) United States Patent
Fällman et al.

(10) Patent No.: US 8,050,782 B2
(45) Date of Patent: Nov. 1, 2011

(54) METHOD AND SYSTEM TO RETRIEVE AND DISPLAY TECHNICAL DATA FOR AN INDUSTRIAL DEVICE

(75) Inventors: Daniel Fällman, Holmsund (SE); Mattias Andersson, Luleå (SE); Mike Kruzeniski, Santa Monica, CA (US); Ingemar Rudgård, Västerås (SE)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 11/596,926

(22) PCT Filed: May 20, 2005

(86) PCT No.: PCT/SE2005/000781
§ 371 (c)(1),
(2), (4) Date: Sep. 24, 2007

(87) PCT Pub. No.: WO2005/114368
PCT Pub. Date: Dec. 1, 2005

(65) Prior Publication Data
US 2008/0065243 A1    Mar. 13, 2008

Related U.S. Application Data

(60) Provisional application No. 60/572,607, filed on May 20, 2004.

(51) Int. Cl.
*G06F 19/00* (2011.01)
*G05B 19/04* (2006.01)
*G05D 23/00* (2006.01)

(52) U.S. Cl. .......... 700/83; 700/245; 700/248; 700/264; 700/276

(58) Field of Classification Search .................... 700/83, 700/245, 248, 264, 276
See application file for complete search history.

(56) References Cited

U.S. PATENT DOCUMENTS

| | | | | |
|---|---|---|---|---|
| 4,675,502 A | * | 6/1987 | Haefner et al. | 219/124.34 |
| 5,053,975 A | * | 10/1991 | Tsuchihashi et al. | 700/264 |
| 5,675,229 A | * | 10/1997 | Thorne | 318/568.11 |
| 5,784,542 A | * | 7/1998 | Ohm et al. | 700/260 |
| 5,864,782 A | * | 1/1999 | Mederer et al. | 702/182 |
| 5,880,732 A | | 3/1999 | Tryding | |

(Continued)

FOREIGN PATENT DOCUMENTS

WO    WO-03/071368 A1    8/2003

OTHER PUBLICATIONS

International Search Report—Aug. 26, 2005.

*Primary Examiner* — Albert Decady
*Assistant Examiner* — Thomas Stevens
(74) *Attorney, Agent, or Firm* — Venable LLP; Eric J. Franklin

(57) ABSTRACT

A method to retrieve and display technical data for an industrial device supervised by a computer program for control, configuration or condition monitoring in an industrial or commercial plant. The method can use a substantially static and easily visible large sized display member to provide a graphical user interface for retrieving data about, and/or controlling, one or more industrial devices. A computing device or mobile computing device send a copy of its graphical user interface to the large display for ease of information retrieval and access.

45 Claims, 7 Drawing Sheets

U.S. PATENT DOCUMENTS

| | | | | |
|---|---|---|---|---|
| 6,031,354 A * | 2/2000 | Wiley et al. | | 320/116 |
| 6,377,281 B1 * | 4/2002 | Rosenbluth et al. | | 715/700 |
| D480,720 S * | 10/2003 | Sjoberg et al. | | D14/341 |
| 6,757,521 B1 * | 6/2004 | Ying | | 455/67.11 |
| 6,813,542 B2 * | 11/2004 | Peshkin et al. | | 700/245 |
| 6,876,368 B2 * | 4/2005 | Dove et al. | | 715/762 |
| 6,944,584 B1 * | 9/2005 | Tenney et al. | | 703/22 |
| 7,116,993 B2 * | 10/2006 | Farchmin et al. | | 455/457 |
| 7,208,900 B2 * | 4/2007 | Carlson et al. | | 318/568.11 |
| 7,301,060 B2 * | 11/2007 | Appel et al. | | 585/240 |
| 7,398,083 B2 * | 7/2008 | Ying | | 455/423 |
| 7,441,242 B2 * | 10/2008 | Barsness et al. | | 718/104 |
| 2001/0025836 A1 * | 10/2001 | Shimogama | | 219/125.1 |
| 2002/0045970 A1 | 4/2002 | Krause et al. | | |
| 2002/0097242 A1 | 7/2002 | Lowry et al. | | |
| 2002/0169522 A1 * | 11/2002 | Kanno | | 700/245 |
| 2002/0173878 A1 * | 11/2002 | Watanabe et al. | | 700/245 |
| 2003/0172368 A1 * | 9/2003 | Alumbaugh et al. | | 717/106 |
| 2004/0046783 A1 | 3/2004 | Montebovi | | |
| 2004/0128029 A1 * | 7/2004 | Kato et al. | | 700/245 |
| 2004/0153213 A1 * | 8/2004 | Lapham | | 700/245 |
| 2004/0186627 A1 * | 9/2004 | Watanabe et al. | | 700/264 |
| 2004/0203930 A1 * | 10/2004 | Farchmin et al. | | 455/457 |
| 2004/0212626 A1 * | 10/2004 | Lyxzen et al. | | 345/589 |
| 2005/0052148 A1 * | 3/2005 | Carlson et al. | | 318/568.11 |
| 2005/0060064 A1 * | 3/2005 | Valen et al. | | 700/264 |
| 2005/0065659 A1 | 3/2005 | Tanaka et al. | | |
| 2005/0114089 A1 * | 5/2005 | Celestini | | 702/186 |
| 2005/0137746 A1 * | 6/2005 | Carlson et al. | | 700/245 |
| 2006/0129682 A1 * | 6/2006 | Hansen et al. | | 709/229 |

* cited by examiner

METHOD AND SYSTEM TO RETRIEVE AND DISPLAY TECHNICAL DATA FOR AN INDUSTRIAL DEVICE

CROSS-REFERENCE TO RELATED APPLICATIONS

This application claims priority to U.S. provisional patent application 60/572,607 filed 20 May 2004 and is the national phase under 35 U.S.C. §371 of PCT/SE2005/000781 filed May 20, 2005.

TECHNICAL FIELD

The invention concerns a method to retrieve and display technical data for an industrial device using a computer program for control, configuration or condition monitoring for one or more devices in an industrial or commercial plant. The invention relates in particular to a method of using substantially static and easily visible display member to provide a graphical user interface for retrieving data about, and/or controlling, one or more industrial devices.

TECHNICAL BACKGROUND

In the area of industrial process control, and the area of supervision of industrial devices generally, the use of mobile devices has improved access to information concerning specific equipment located in various sections of an industrial or commercial plant. While mobile devices ease and support many kinds of tasks and activities that stationary computers do not normally support, there are certain features and/or functions that are not optimal. However the small display screens and hand-held use typical for mobile devices such as PDAs and mobile phones make them very individual in their character, and controls, buttons and graphic interfaces etc vary somewhat from supplier to supplier. Clumsy or hard to operate controls or graphic user interfaces and small input devices may limit the amount of user input the user can, in practice, supply.

SUMMARY OF THE INVENTION

A primary aim of the present invention is to provide a method to retrieve and display technical data for an industrial device using a computer program for control and at least one computing device running said control program at least in part, wherein said control program comprises a graphical user interface arranged capable of generating a signal to retrieve said technical data related to one or more industrial devices.

A secondary aim is to provide a system for carrying out the method, and a computer program for carrying out the method.

Another aim of the invention is to provide more than one instance of a graphical user interface (GUI) for carrying out the method.

According to a first aspect of the invention these and more aims are met by the invention in the form of a method carried out by one or more computer programs running at least in part on the computing device that enable a copy of the graphical user interface running on the computing device to be displayed on a large display screen, and data retrieved and/or manipulated by means of actions carried out in relation to the GUI displayed on the large display screen.

According to another aspect of the invention these aims are met by the invention in the form of a system.

In a preferred embodiment, the computing device is portable. In a still further embodiment the computing device is arranged for wireless communication. In a still further embodiment, the computing device is both portable and arranged for wireless communication.

The invention provides a user such as an operator or an engineer with means to make a copy of display a GUI that may be running on a first computer, such as a portable data assistant (PDA) be sent to a large display screen for easier manipulation of the GUI and easier access to information retrievable via the GUI. Instead of examining information and/or images on a small display screen, such as a 10" monitor or a PDA display, the user may examine information displayed on a large screen. The user may also discuss the information and/or images of a selected industrial device with other operators or engineers so as to obtain information about the equipment, solve a problem, arrange for production processes, different production batches or versions etc, maintenance for one or more devices, and so on.

The principal advantage of the invention is that technical data and other information pertaining to a selected device may be quickly and easily retrieved and displayed, making supervision and/or control of selected industrial devices, automation devices, robots, power distribution devices, to be carried out in a timely manner, so reducing both predictable delays such as production set-up times, machine configuration or planned maintenance as well as downtime due to unpredicted stoppages, problems and the like. One or more embodiments of the invention may be used to carry our supervision, data logging or control actions for any industrial device that is in some way supervised by an industrial control system, and thus has a very wide range of applications and potential applications.

In a preferred embodiment the computing device of an aspect of the invention may embodied as a robot teaching device, a Teach Pendant Unit (TPU). Thus a technician teaching a robot one or more waypoints of a tool path may transfer one or more parts of the path onto the large display screen in order to see and control certain parts of the teaching more easily and/or to share or consult with others how or where certain waypoints or process information points should be configured, or edited and re-configured.

In a preferred embodiment of the invention the computing device comprises one or more microprocessor units or computers. The control unit(s) comprises memory means for storing one or more computer programs that control the graphical user interface. Preferably a such computer program contains instructions for the processor to perform the method as mentioned above and described in more detail below. In one embodiment the computer program is provided on a computer readable data carrier such as a CD ROM.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

A user such as an operator, engineer or technician in a factory or other installation for industrial or commercial operations wishes to retrieve information about an industrial device. The user activates a control program of a computer or computing device to display a part of the installation including the industrial device of interest. According to an embodiment of the present invention, the industrial device of interest may be selected and marked in some way, preferably by dragging a representation on a graphic user interface to a graphic device such as a container or bucket, and dropping it there.

To retrieve and display technical data about the industrial device, the user then goes to a large sized display member located in the installation at a given place, so as to display and or manipulate the information on a large screen, and with details easily visible. As the user approaches the large screen, a wireless device carried by the user is recognised by a wireless device in the vicinity of the large screen, and may display a message greeting the user.

The user then operates the computing device, first selecting the marked industrial device, and secondly touching the large screen or otherwise making a gesture to signal for service. The large screen then displays a copy of the same display that the user marked on his/her computing device. The user, by means of one or more computer programs, and an interactive function arranged with the large display, now has the industrial device of interest displayed and easily visible for information retrieval or even configuration of control functions.

In short, the inventive method comprises actions such as user walks through the installation, selects one or more devices of interest, user selects, drag and drop equipment to bucket on a PDA screen, approaches large display screen, which recognises the user, or more particularly recognises the computing device the logged-in user is carrying, user selects, and drag-and-drops, or equivalent, the equipment from PDA to large display screen, user operates graphical user interface on large display screen via operations at the large screen, detected by a position detecting member of the large screen such as ultrasonic, infra-red, LCDs or visible light sensors, or by direct contact (eg as a touch-screen) between a pointer and the screen member;

user may also or alternatively operate the graphical user interface on large display screen via operations or selections on the PDA.

Figure 4:
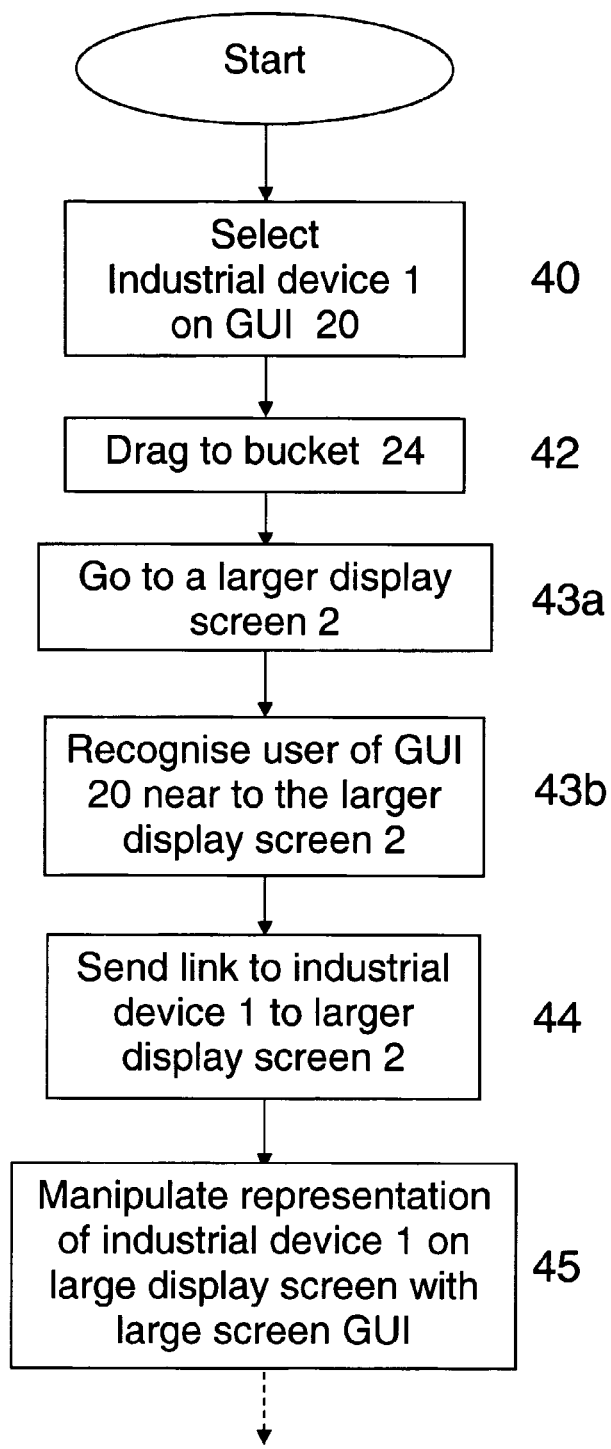
FIG. 4 is a flowchart for a method according to an embodiment of the invention.

FIG. 4 shows a flowchart for at least one method of an embodiment of the invention. A user selects 40 an industrial device using a GUI 20 (Graphical User Interface) of a computing device 1, 1', and moves or drags 42 the selected device to a "bucket" or other graphic element on the GUI. When desired, for example when the user approaches 43a a large display screen, and is recognised 43b, the user operates the computing device to send 44 a copy of the GUI running on the computing device to the large display screen for display. This is carried out by making a link to an object representing, in this case industrial device 1, that was previously selected and marked on the PDA or other computing device, then available to a computer controlled process or program to retrieve information associated with that object for display of the information on the large screen. Once displayed on the large screen, the user may manipulate 45 the GUI in any applicable way.

Figure 5:
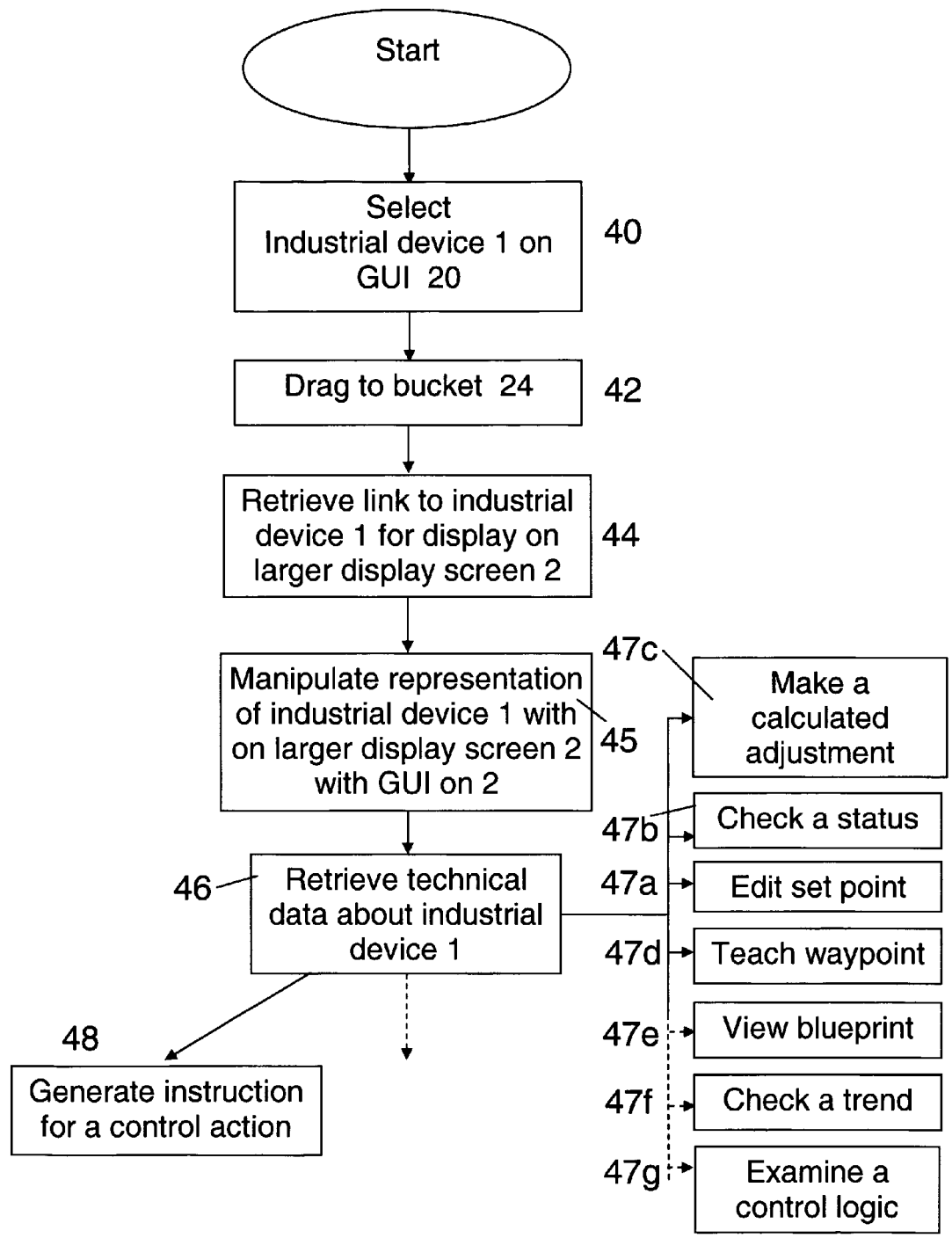
FIG. 5 is a flowchart for a method according to a preferred embodiment of the invention.

FIG. 5 shows a flowchart for a development of the method according to FIG. 4. A user selects 40 an industrial device of interest, marks it in some way, eg drags a representation to an on-screen graphic, a container etc 42. The user then activates the computing device and/or processes running display on the large display screen to retrieve a link 44 to the same industrial device so that the information about the selected industrial device 1 is displayed on the second and large screen 2. On the large screen display information may be retrieved and/or instructions for actions issued by manipulating 45 the GUI of the second large screen.

Upon retrieving technical data or other information about the industrial device, the user may, for example, edit a set point 47a of a configuration setting or predetermined parameter value, check a status 47b, make an engineering change or make a calculated adjustment 47c, teach a waypoint 47d for a robot tool path on a workpiece, view a drawing, rotate a CAD drawing or examine a blueprint 47e, check a trend 47f, examine a control logic 47g and so on; and/or generate instructions for a control action 48.

Figure 1:
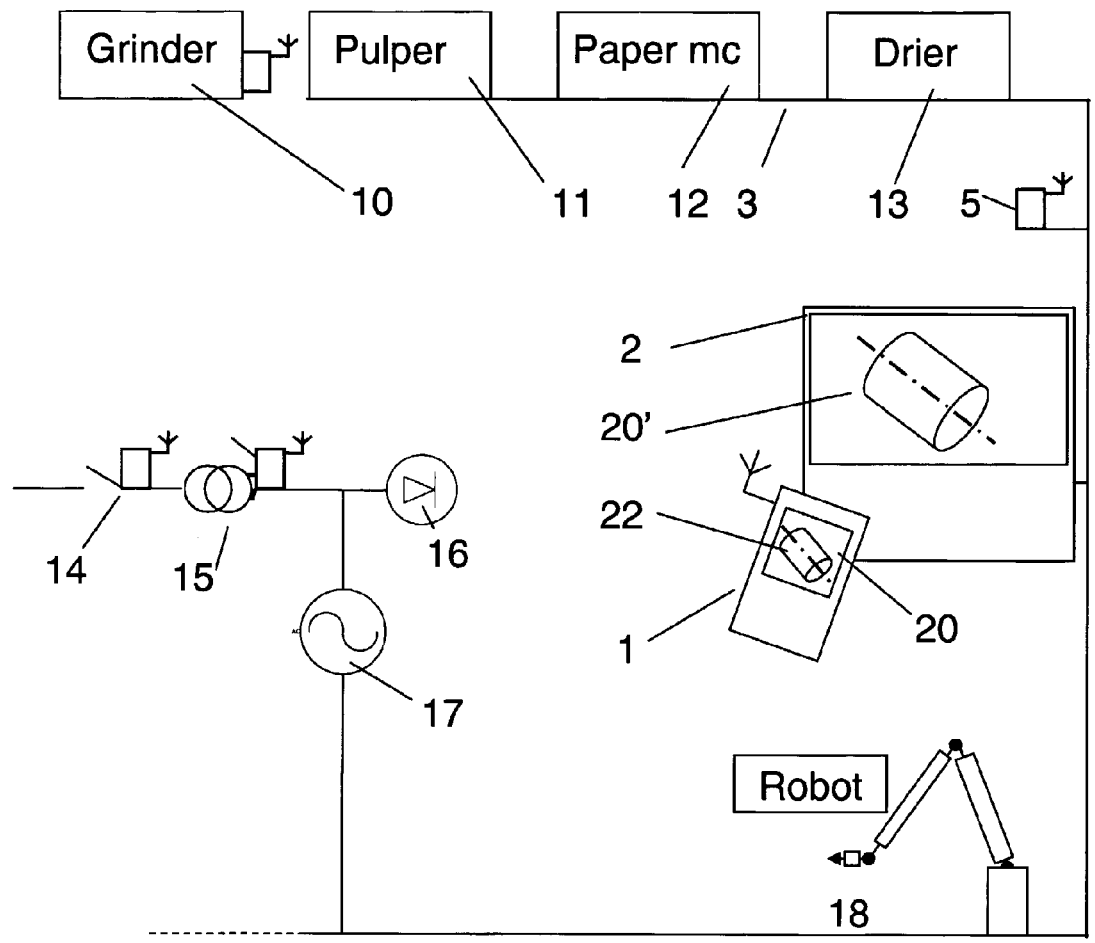
FIG. 1 is a schematic or block diagram showing a layout in an industrial installation with a system according to an embodiment of the invention.

FIG. 1 shows schematically an industrial installation. It shows some industrial process or production equipment, a grinder 10, pulper 11, paper machine 12, drier 13, and some electrical power and distribution apparatus, a breaker 14, a transformer 15, a converter 16 and a generator 17. The industrial installation could also include metal production, oil and gas production, upstream and downstream process, vehicle manufacturing and vehicle assembly. An industrial robot 18 is also represented. The installation also includes a large display screen 2 set up at a given location. The figure shows that a copy 21 of a GUI 20 on a computing device 1 may be displayed on the large display screen 2. The figure also shows a data network, such as a LAN (local Area Network) which is present in the installation. Some devices 11, 12, 13, 2, 18, 17, 16 are connected to the LAN by wired connections. The LAN also comprises one or more wireless nodes 5. Some devices 1, 10, 14, 15 are shown with antennae, so as to represent that they may be wirelessly connected to the data network.

Figure 2A:
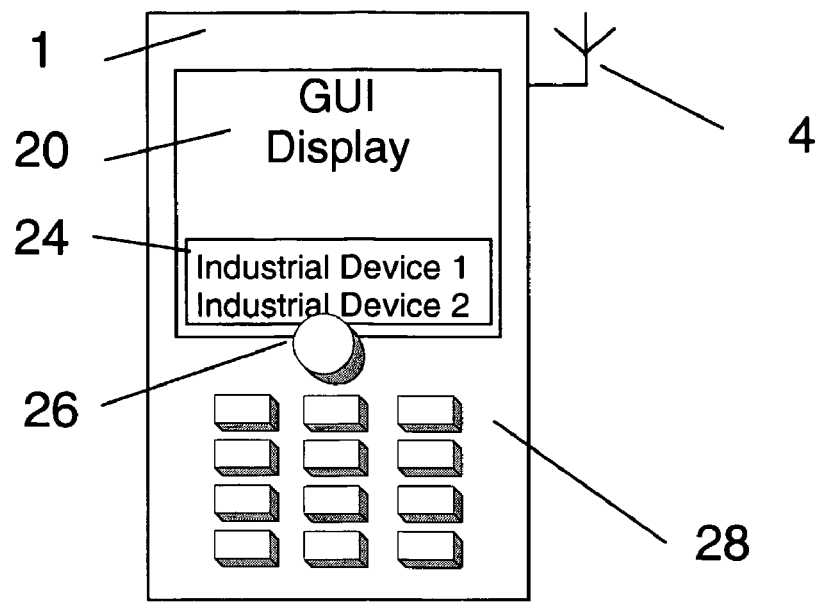
FIG. 2a is a schematic block diagram of a computing device for a system according to an embodiment of the invention.

FIG. 2a shows a computing device 1 according to an aspect of the invention, which device in this case is arranged for wireless communication, indicated by an antenna 4. The computing device 1 is arranged with a display on which is displayed a GUI 20. The GUI comprises a "bucket" 24, in this exemplary example a graphic device onto which one or more other graphic elements or placeholders representing industrial devices in the installation may be dragged so as to select and mark them for display on the large screen display 2. Bucket 24 is seen to be holding two devices, industrial device 1 and industrial device 2.

Computing device 1 may also comprise a keypad or other operating means 28, and may also comprise a physically moveable input means 26 such as a joystick, miniature joystick, rubber pointer, thumbwheel, roller-ball, touch pad and so on.

The majority of industrial devices of the installation are normally in some way all under the supervision of one or more computer programs for monitoring and/or control. The one or more control programs contain technical data and/or links to technical data and other information for each industrial device. The graphical user interface may be operated by for example directly selecting a graphic of an equipment and for example rotating an image or CAD image of the equipment on screen. Another variation using the GUI is by selecting an icon, text label or similar representing an equipment when shown as a part of a process schematic, or a tree diagram. By so manipulating the GUI the user may select all or any such information relevant to the chosen industrial device, or a process or equipment that it is a part of, and retrieve such relevant stored parameters, variables, set-points, logged values as the user decides. This information may be in any form, such as numbers, stored values, real-time values, text, tables, trends, graphs, pie-charts and so on. Drawings or CAD drawings of equipment construction or parts may also be retrieved and displayed large scale on the large screen so that the user and others may easily retrieve and access, see and discuss or otherwise use information about the industrial device.

Figure 2B:
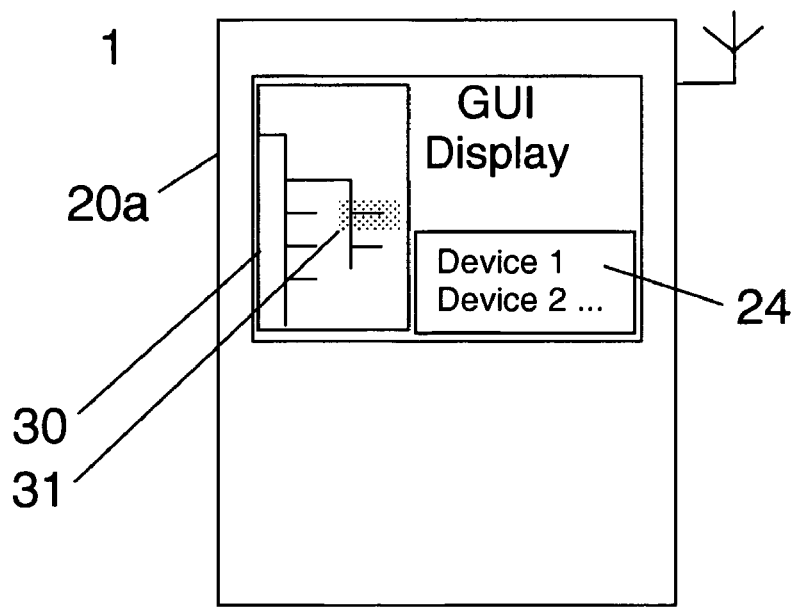
FIG. 2b is a schematic diagram of the same computing device comprising a development of the graphic user interface.

FIG. 2b shows a similar computing device 1 according to another aspect of the invention, which in this case is arranged with an additional graphic display element 30, for display with or combination with GUI 20. The bucket 24 is still displayed in some form, for example accessible as a layer underneath or partly underneath the tree diagram 31. The tree diagram is a representation of part of the installation or a process or part process thereof, showing devices etc under supervision of a control system. The user may navigate around in the control system represented by the tree diagram 31 and access one or more selected devices, or data of the selected devices, or attributes of the selected devices, or CAD diagrams of the selected devices, wiring diagrams, configuration screens, in short, all information about any device that the control system has in data storage or information the control system has links to.

The drawings or other material may comprise a static diagram, 2-D or 3-d, or moving a diagram such as an animation, simulation, 3-D model, video clip or combination. A user may zoom-in on any graphic detail of an equipment or process diagram and see an enlarged image of the selected detail. Combinations of computer generated graphic material may also be superimposed on real pictures or CAD diagrams of equipment, such as, for example, virtual reality displays for use with robots in teaching and/or editing technical process waypoints or process points on a workpiece of some sort using a TPU (Teach Pendant Unit). The graphical user display may include a graphical representation, such as a side tree, with a tree diagram or other representation with which the user may navigate through a plant section and select different attributes for one or more different industrial devices.

The computing device 1 may be a static computer terminal. Preferably the computing device is embodied as a portable computing device, such as a notebook computer or a PDA (Personal data assistant), connected to a data network 3 by a wired connection or a wireless connection, such as a wireless LAN (WLAN). The computing device may also comprise a combined mobile phone and computing device, and/or PDA etc.

In a preferred embodiment, the large screen display is in the form of a commercially available digital whiteboard. The whiteboard is arranged with ultrasound sensors to register a position on the whiteboard so as to record interactions with a graphical user interface displayed on the whiteboard.

The graphical user interface 20, 20a, is designed to comprise layering of graphic images and items, so as to optimise and maximise the technical information that may be both viewed and accessed via the visible area. This further enables not only a presentation of many graphic elements but also increased means to provide a plurality of possible combinations of graphic information elements to be viewed simultaneously, as required.

Figure 7:
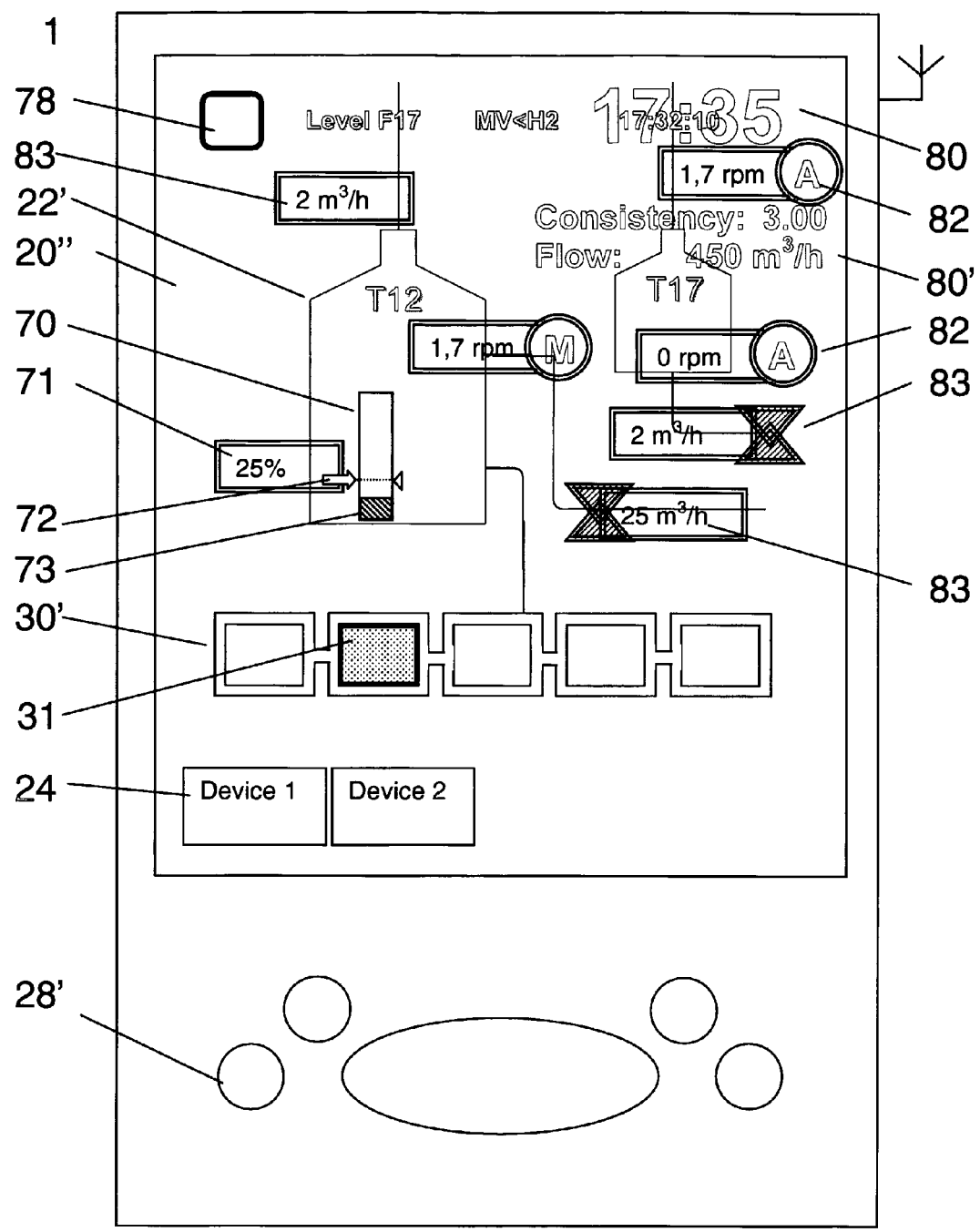
FIG. 7 is a schematic diagram of the computing device comprising one or more developments of the graphic user interface.

The graphical user interface 20, 20a may be in colour, a reduced number of colours, or monochrome. FIG. 7 shows in a black and white drawing a representation of a layered graphical user interface normally comprising different colours. In the diagram graphic elements are arranged in different layers, transparently layered over each other, so that access to great deal of information is available by means of a small screen area.

FIG. 7 shows a computing device 1 with a keypad or button input means etc 28' and a GUI. The development shown of the graphical user interface 20" displays an industrial device in the form of a process 22' with tanks T12 and T17, a motor M, piping, rotation speed meters or sensors and one or more flowmeters. Process tank T12 has a level meter display 70 superimposed over the equipment of process 22" with a 25% level 72 indicated and associated information displayed to describe or name that level with a transparent or semi-transparent label 71, as well as another value, an actual or historic or trend value and so on, for a level 73 in the tank T12. Similarly a flow value 74 and a motor rpm 75 for tank T12 are shown superimposed in a layer on the process equipment graphic. FIG. 7 also shows flow values 83 and rotation speed values 82 superimposed in a layer on the process graphic.

Near the bottom of the GUI 20" is also shown on the same screen a process layout or process schematic 30' which is comparable in function to a tree diagram or other relational diagram 30 of FIG. 2b. Similarly a part of the process 31 is indicated with a dot pattern to show that it has been selected or activated on the screen, which part would then comprise the tanks T12 and T17 also currently displayed on the GUI. Near the top of the GUI is shown a status message 80 displayed in a layer. The status message in this example shows real time to be 17:35, product Consistency to be 3.00 and a product Flow or overall flow to be 450 m$^3$/hour.

Also near the top of the GUI an alarm or event message 78 displays a symbol indicating alarm or event, a plant or process location Level F17, a parameter or set-point information MV<H2, and an event time of 17:32:10. This message is normally shown in a red colour and on another layer and is seen superimposed over other layers. Near the bottom of the GUI two selected industrial devices 24, Device 1 and Device 2 may be seen selected or recorded for subsequent access to technical data.

In a most preferred embodiment, the large screen display is in the form of a screen arranged with a commercially available back projector or other display means operating to produce the image from behind the screen rather than projected from in front of the screen. The large screen display is also arranged with detection members such as ultrasound sensors to register a position on or adjacent the large screen display so as to record interactions of a user with a graphical user interface displayed on the large screen display.

In another preferred embodiment, the program for control of processes and industrial devices in a facility may use representations other than tree diagrams to symbolise facets of the equipment controlled. Equipment and or devices may be represented in terms of process logic, in relational diagrams, process-flow diagrams, function block schemas, flow charts or any other way for representing industrial, chemical or commercial processes. The user may then use a tree structure or a process logic structure etc to navigate within and/or between devices and processes represented in the control program to retrieve technical data about a device or a process etc.

In a preferred embodiment the present invention may advantageously be used to retrieve and display technical data or information in respect of an industrial robot. The computing device may be a general portable computing device, such as a Personal Data Assistant (PDA) or a may be a more specialised computing device such a Teach Pendant (TPU) for a robot.

In a particularly advantageous embodiment the computing device is a wireless portable computing device embodied as a TPU. The TPU may be activated or otherwise begin operations in respect of an industrial robot in a hot plug routine, that is, without performing a pause or power down/power up of the robot before the TPU can begin to operate or control the robot.

Figure 3:
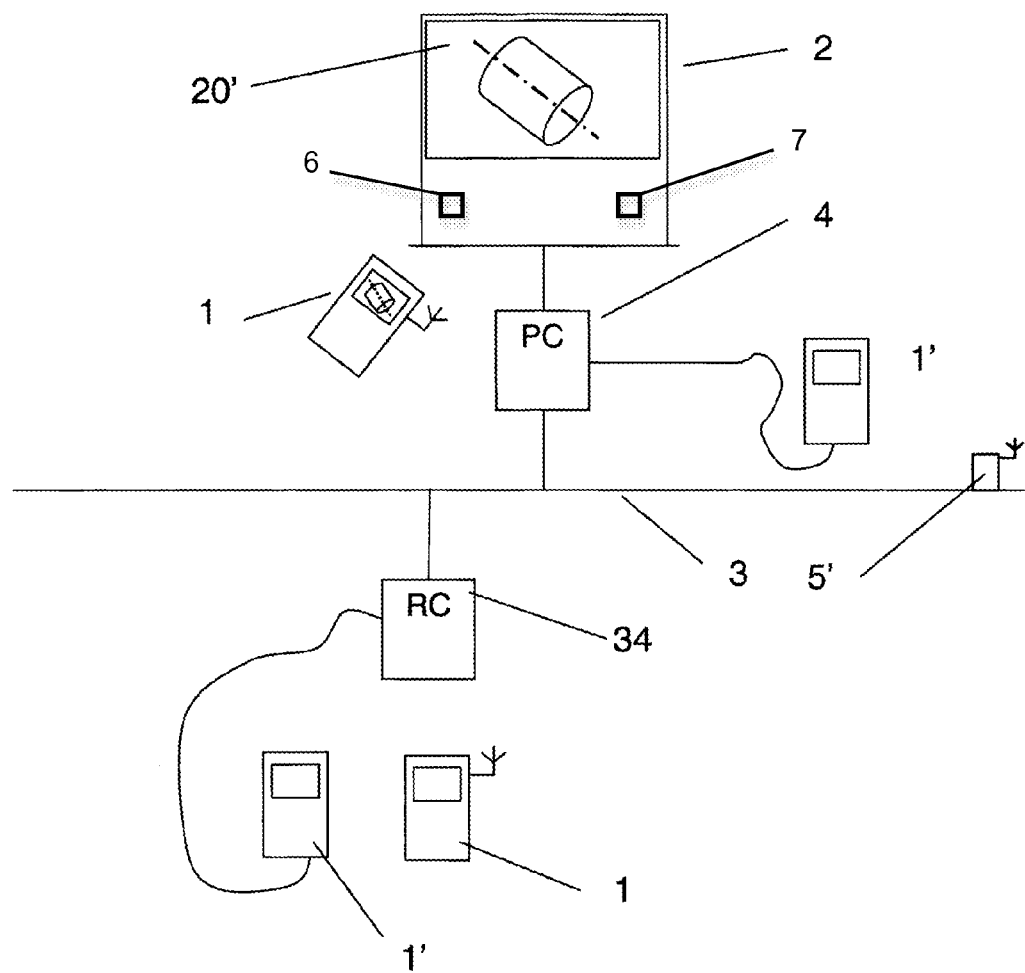
FIG. 3 is a schematic or block diagram of a layout in an industrial installation with a data network and a wireless node showing a system according to another embodiment of the invention.

FIG. 3 shows an industrial installation that also comprises a robot (not shown in FIG. 3). It shows the large display screen 2 connected to a data network 3. The data network comprises one or servers and/or computers such as a PC 33. A robot controller RC 34 may be connected to the data network. One or more computing devices 1, 1' are shown. Beside the large screen 2 a wireless computing device 1 is shown, with such that the GUI is also displayed by the large screen. A second computing device 1' is also shown connected to the PC 33. A third computing device 1' is shown arranged in the vicinity of, and connected to, the robot controller 34. A fourth variation of the computing device 1 is shown arranged in the vicinity the robot controller 34 and wirelessly connected to it via the data network 3 that is also equipped with one or more wireless nodes 5'. One or more of the computing devices may be embodied as a TPU for control or supervision of the robot.

The TPU may be equipped with a display screen, which may be relatively small in size, it may run an operating system of its own as well as application software for performing operations concerned with controlling and/or teaching a robot. The user of the TPU can mark the industrial device, in this case an industrial robot or an automation device arranged to function in cooperation with the robot and drag-and-drop the device on the TPU display screen into a marked area, or bucket. The user then approaches a large display screen at a given place, which may for example still be in line-of-sight of the robot or production cell, and the user is recognised by the large display screen. The user then selects points on a copy of the graphical user interface presented on the TPU and begins to manipulate the interface, so as to retrieve 45 technical data or other information concerning the selected device, the robot or other automation equipment.

In another embodiment the computing device may be static, in contrast to portable. In this case the user navigates through a control program via a static computing device and marks one or more industrial device for later display. The user then goes to the given location with the large screen and calls up the selected industrial device that he/she had already selected using a static computer, computer workstation or "dumb" computer terminal on his/her desk. By use of the word "dumb" it is meant a computer on which although an interface or a graphical user interface is presented, and may be manipulated, the machine typically does not run an operating system and/or its own instance of application software, and instead the essential computer programs for the application are run on another and more powerful, central computer to which the dumb terminal is connected.

In another preferred embodiment the GUI displayed on the large screen may be manipulated using the computing device 1. Having transferred a copy of the representation from, for example, a portable computing device 1, 1', the user may continue to manipulate information provided on the large display screen but using input means and output means of the computing device or PDA.

Figure 6:
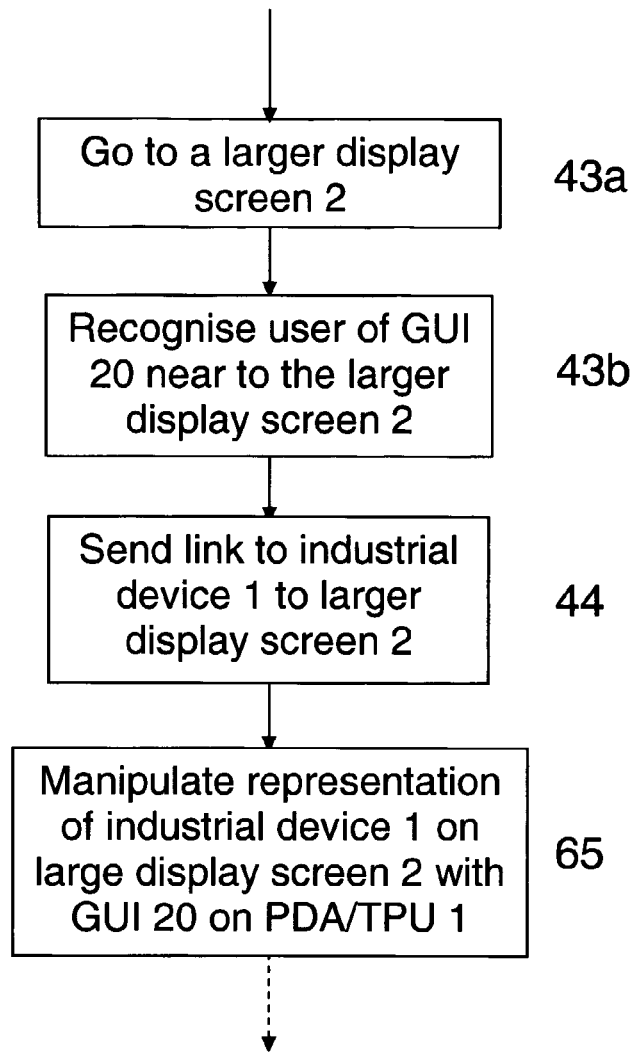
FIG. 6 is a flowchart for a method according to another preferred embodiment of the invention.

FIG. 6 shows a flowchart for a method which is a development of the method of FIG. 4, in which a user approaches 43*a* the large display screen 2 as before, is recognised 43*b*, takes actions so that a representation of information about an item of interest, industrial device 1 may be accessed 44 and displayed in a GUI on the large screen. The user then manipulates the representation of information 65 but using graphic members or other input means of the computing device to carry out actions on the large screen. A portable computing device, for example held in the hand, then becomes a means to select an item supervised by and represented in a control program, produce instructions so that references to the item may be accessed via a data network so that information is displayed on a separate and large display screen, and then manipulated that information from the hand held computing device. The hand held computing device in this embodiment functions somewhat like a remote control for an electronic device.

An additional advantage of this aspect is that the large display screen of this embodiment need not be equipped with software and/or hardware to detect a user's movements in order to register instructions to manipulate the GUI of the large display member.

Remote control (v) The PDA user simply uses the large screen to display what would be difficult or impossible to access or manipulate using a small display 20 on the PDA. Thus the user uses the graphic or other input means of a computing device or portable computing device, PDA etc, by generating instructions which may be sent via output means of the PDA direct via a wire or antennae 4 or else via a data network 3 to the large screen display where the information may be manipulated by means of the large screen GUI.

In an advantageous aspect the function of the large screen display may be carried out by any display device arranged with a suitable data connection connectable to the first computing device 1. The data connection may for example be direct cable, a LAN or WLAN. For example a user may approach any workstation in the vicinity of the user or the industrial device of interest that has a larger display than the user's PDA. The user establishes a data connection to that data display. The data connection may be established at least at first by means of a wireless network or temporary wireless network, using for example a radio technology such as Bluetooth, or an IR connection to initiate recognition of the selected display screen (workstation) and/or recognition of the PDA user. Thereafter the methods and advantages are as described. Any workstation in a plant may be used, so long as there is means to identify the workstation, and any kind of computer controlled display device may be used, including a fixed workstation, portable computer or laptop, notebook etc or even suitably equipped telephone, provided that it is connected to a display that can provide a GUI. The second display device may include a wireless member 6 for detecting movement and position of a user relative a graphical user interface displayed on the second display device. The second display device may include a wireless member 7 for detecting movement and position using any means from the list of: ultrasonic sound, infra red light, visible light.

One or more of the devices or units connected to the industrial devices in the plant, factory or other installation of interest may be equipped with a wireless transmitter or transceiver.

Wireless communications between the devices and a control unit of a robot process cell may be carried out using any suitable protocol. Suitably low-energy transmissions compatible with explosion-proof standards for use, for example, by a painting robot, may be made using a short-range radio communication, such as a low-energy transmission conforming to a protocol compatible with any of: standards issued by the Bluetooth Special Interest Group (SIG); any variation of IEEE-802.11, WiFi, Ultra Wide Band (UWB), ZigBee or IEEE-802.15.4, IEEE-802.13 or equivalent or similar. A standard compatible with WAPI (WLAN Authentication and Privacy Infrastructure, GB15629.11-2003 or later) may advantageously be used in situations where encryption of the wireless signal is necessary or advantageous.

Generally a radio technology working at high frequencies usually greater than 400 MHz, for example in the ISM band or higher, with significant interference suppression means by spread spectrum technology is the preferred type of wireless communication. For example a broad spectrum wireless protocol in which each or any data packet may be re-sent at other frequencies of a broad spectrum at around 7 times per millisecond, for example, may be used, such as in a protocol developed by ABB called Wireless interface for sensors and actuators (Wisa). Wireless communication may alternatively be carried out using Infra Red (IR) means and protocols such as IrDA, IrCOMM or similar. Wireless communication may also be carried out using sound or ultrasound transducers.

One or more microprocessors (or processors or computers) comprise a central processing unit CPU performing the steps of the methods according to one or more aspects of the invention, as described for example with reference to FIGS. 4-6. The method or methods are performed with the aid of one or more computer programs, which are stored at least in part in memory accessible by the one or more processors. It is to be understood that the computer programs for carrying out methods according to the invention may also be run on one or more general purpose industrial microprocessors or computers instead of one or more specially adapted computers or processors.

The computer program comprises computer program code elements or software code portions that make the computer or processor perform the methods using equations, algorithms, data, stored values, calculations and statistical or pattern recognition methods previously described, for example in relation to FIGS. 4-6. The computer program may include one or more small executable program such as a Flash (Trade mark) program. A part of the program may be stored in a processor as above, but also in a ROM, RAM, PROM, EPROM or EEPROM chip or similar memory means. The or some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on one or more data servers. Other known and suitable media, including removable memory media such as Sony Memory Stick™ and other removable flash memories, hard drives etc. may also be used. The program may also in part be supplied from a data network, including a public network such as the Internet. The computer programs described may also be arranged in part as a distributed application capable of running on several different computers or computer systems at more or less the same time.

It should be noted that while the above describes exemplifying embodiments of the invention, there are several variations and modifications which may be made to the disclosed solution without departing from the scope of the present invention as defined in the appended claims.

The invention claimed is:

1. A method to retrieve, display and manipulate technical data for an industrial device and control the industrial device, the method comprising:
   selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device,
   recognizing the first computing device in a vicinity of a separate display member separate from the first computing device and making a connection via the data network between the first computing device and the separate display member,
   transmitting a reference corresponding to the representation of the industrial device from the first computing device via the data network to the separate display member,
   displaying on the separate display member a graphical user interface related to the industrial device,
   operatively linking the separate display member to the industrial device via the data network, such that the graphical user interface displayed on the separate display member is manipulateable to carry out at least one of retrieving, displaying or manipulating the technical data for the industrial device or controlling the industrial device,
   manipulating the graphical user interface displayed by the separate display member to carry out at least one of retrieving, displaying or manipulating the technical data for the industrial device or controlling the industrial device, and
   carrying out a data retrieval action via a graphic display on the separate display member by sending a signal from a portable said first computing device to the data network,
   wherein a portable computing device is arranged for a data retrieval action or control signal for control or supervision of an industrial robot, wherein the portable computing device comprises a teach pendant member for data retrieval, program editing or control of an industrial robot, and wherein the portable computing device is connected to or otherwise activated for data retrieval or control of an industrial robot in way that is hot-pluggable and without pausing or shutting down the industrial robot.

2. The method according to claim 1, further comprising:
   transmitting a reference for a representation of said industrial device displayed by said graphical user interface to the separate display member via a data network running an instance of said graphical user interface.

3. The method according to claim 2, further comprising:
   retrieving data associated with information represented by said graphical user interface and providing the retrieved data to a computer or processor for display and manipulation of said graphical user interface on the separate display member.

4. The method according to claim 3, further comprising:
   generating on the separate display member an instruction to manipulate said technical data utilizing said graphical user interface.

5. The method according to claim 4, further comprising:
generating a data retrieval action or a control action from said graphical user interface by an instruction generated by graphic display members of the separate display member.

6. The method according to claim 5, further comprising:
generating a data retrieval action or a control action from said graphical user interface and displaying an image comprising virtual reality information as computer generated graphic material superimposed on other information, real pictures or diagrams.

7. The method according to claim 1, further comprising:
wirelessly sending the reference corresponding to the representation of the industrial device to the data network.

8. The method according to claim 2, further comprising:
sending the reference displayed by the said graphical user interface wirelessly utilizing a wireless LAN.

9. The method according to claim 1, further comprising:
wirelessly sending a data retrieval action or control signal relative the said graphical user interface from the data network to the separate display member.

10. The method according to claim 9, further comprising:
sending a data retrieval action or a control signal relative the said graphical user interface from the data network to the separate display member by a radio signal.

11. The method according to claim 1, further comprising:
sending a data retrieval action or a control signal relative the said graphical user interface from the data network to the separate display member by a wire connection to a data network.

12. The method according to claim 1, wherein the industrial device is arranged relative an industrial robot.

13. The method according to claim 1, further comprising:
selecting utilizing said first computing device the representation of an industrial device and marking the industrial device,
manipulating said graphical user interface causing the graphical user interface to send a reference to the representation of the marked industrial device to the separate display member.

14. The method according to claim 1, further comprising:
selecting utilizing said first computing device one or more representations of a plurality of industrial devices and marking them.

15. A method to retrieve, display and manipulate technical data for an industrial device and control the industrial device, the method comprising:
selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device,
recognizing the first computing device in a vicinity of a separate display member separate from the first computing device and making a connection via the data network between the first computing device and the separate display member,
transmitting a reference corresponding to the representation of the industrial device from the first computing device via the data network to the separate display member,
displaying on the separate display member a graphical user interface related to the industrial device,
operatively linking the separate display member to the industrial device via the data network, such that the graphical user interface displayed on the separate display member is manipulateable to carry out at least one of retrieving, displaying or manipulating the technical data for the industrial device or controlling the industrial device,
manipulating the graphical user interface displayed by the separate display member to carry out at least one of retrieving, displaying or manipulating the technical data for the industrial device or controlling the industrial device,
selecting utilizing said first computing device one or more representations of a plurality of industrial devices and marking them, and
marking one or more representations of a plurality of industrial devices by moving them to a selected part of the graphic user display represented as a container.

16. A method to retrieve, display and manipulate technical data for an industrial device and control the industrial device, the method comprising:
selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device,
recognizing the first computing device in a vicinity of a separate display member separate from the first computing device and making a connection via the data network between the first computing device and the separate display member,
transmitting a reference corresponding to the representation of the industrial device from the first computing device via the data network to the separate display member,
displaying on the separate display member a graphical user interface related to the industrial device,
operatively linking the separate display member to the industrial device via the data network, such that the graphical user interface displayed on the separate display member is manipulateable to carry out at least one of retrieving, displaying or manipulating the technical data for the industrial device or controlling the industrial device,
manipulating the graphical user interface displayed by the separate display member to carry out at least one of retrieving, displaying or manipulating the technical data for the industrial device or controlling the industrial device, and
receiving in a wireless local area network a wireless signal from a computing device of a user, comparing information in the wireless signal with information with log-in information of a control system of the industrial device and matching the computing device of the user, so recognizing the user in close proximity to the separate display member.

17. A computer program product, comprising:
a non-transitory computer readable medium; and
computer program instructions recorded on the computer readable medium and executable by a computer or processor will cause the computer or processor to carry out a method to retrieve and display technical data for an industrial device comprising
selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device, recognizing the first computing device in a vicinity of a separate display member separate from the first computing device and making a connection via the data network between the first computing device and the separate display member, transmitting a reference corresponding to the representation of the industrial device from the first computing device via the data network to the separate display member, displaying on the separate display member a graphical user interface related to the industrial device, operatively linking the separate display member to the industrial device via the data network, such that the graphical user interface displayed on the separate display member is manipulateable to carry out at least one of retrieving, displaying or manipulating the technical data for the industrial device or controlling the industrial device, manipulating the graphical user interface displayed by the separate display member to carry out at least one of retrieving, displaying or manipulating the technical data for the industrial device or controlling the industrial device, and retrieving technical data for devices used in conjunction with from any a list of: industrial production; metal production; pulp and paper manufacture; automated industrial processes; oil and gas production, upstream or downstream processes; chemical industry equipment and processes, vehicle manufacturing, vehicle assembly.

18. A computing device for retrieval and display of technical data for an industrial device using a computer control program for control of the industrial device, comprising:
   a graphical user interface displayed on a display of the computing device and comprising at least one graphical representation member representing a selected said industrial device, wherein the computing device is configured to interact with said computer control program via a network for carrying out at least one of retrieving, displaying, selecting or manipulating the technical data for the industrial device or controlling the industrial device,
   a selector configured to select utilizing a first computing device the representation of the industrial device and marking the industrial device,
   a transmitter configured to transmit a reference concerning the representation from the first computing device via a data network to a separate display member separate from the first computing device, and
   a graphical user interface displayed on the separate display member operatively connected to via the network to the computer control program for carrying out at least one of retrieving, selecting or manipulating data regarding the industrial device or controlling the industrial device,
   wherein the graphical user interface displays together a graphical representation of any of a list of: an industrial device, an industrial device in a process schematic, an industrial device in a tree diagram, an industrial device recorded for subsequent information access or retrieval any of which may be arranged in transparent or semi transparent layers.

19. The device according to claim 18, wherein said graphical user interface comprises a graphical representation member for recording a selected industrial device for subsequent retrieval of technical information associated with the industrial device.

20. The device according to claim 18, further comprising:
   a transmitter configured to send a reference for the representation of a said industrial device via a data network to the separate display member.

21. The device according to claim 19, further comprising:
   a member for transmitting and/or receiving wireless communication to and/or from the data network.

22. The device according to claim 21, wherein the member for wireless communication is compatible with a wireless local area network.

23. The device according to claim 18, wherein the graphical user interface displays together a graphical representation of an industrial device and a display comprising virtual reality information or computer generated graphic material superimposed.

24. The device according to claim 23, wherein the graphical user interface displays a graphical representation of an industrial device and a display comprising virtual reality information for teaching a robot and editing a robot program.

25. The device according to claim 18, further comprising:
   a recorder configured to record graphical, freehand or text annotations on a graphical representation of an industrial device and associate the text annotations with a link to the industrial device.

26. A system for retrieval and display of technical data for an industrial device, the system comprising:
   a computer program for control comprising a graphical user interface configured to generate a signal and send the signal through a network to at least one industrial device to carry out at least one of retrieve, display, or manipulate said technical data related to the at least one industrial device or control the at least one industrial device, the graphical user interface comprising at least one graphical representation member for representing a selected said at least one industrial device,
   at least one computing device running a process compatible with said control program at least in part, wherein the graphical user interface is configured to permit a user to select utilizing said at least one computing device a representation of the industrial device and marking the at least one industrial device, wherein a first computing device is operatively connected via a data network to the industrial device,
   a data network to which said at least one industrial device and the at least one computing device are connected,
   a separate display device also operatively connected to the data network and separate from the at least one computing device, the separate display device being operatively linked to the at least one industrial device via the data network such that a graphical user interface displayed on the separate display device is manipulateable to carry out at least one of retrieving, displaying or manipulating the technical data for the industrial device or controlling the at least one industrial device,
   a unit configured to recognize the at least one computing device when the at least one computing device is in a vicinity of the separate display device,
   a unit configured to detect a movement of a user relative to a position on said graphical user interface of the separate display device,
   a control configured to provide an instruction or a control signal dependent on the detected movement and/or a relative position of the user, a transmitter configured to transmit a reference concerning the representation of the industrial device from the at least one computing device via the data network to the separate display device, wherein the graphical user interface is manipulated dependent on the reference, and a control configured to generate an instruction through said separate display to manipulate to carry out at least one of retrieving, displaying or manipulating the technical data for the industrial device or controlling the industrial device.

27. The system according to claim 26, wherein the at least one computing device is a portable computing device.

28. The system according to claim 27, wherein the portable computing device comprises a member for transmitting and/or receiving wireless communication to and/or from the data network.

29. The system according to claim 28, wherein the wireless communication member is compatible with a wireless local area network.

30. The system according to claim 26, wherein the separate display device is connected to the data network by a wireless communication member.

31. The system according to claim 30, wherein the separate display device is connected to the data network by a wireless local area network.

32. The system according to claim 26, wherein the separate display device is hard wired to a data network or device connected to the data network.

33. The system according to claim 26, wherein the separate display device comprises a wireless member for detecting movement and position of a user relative a graphical user interface displayed on the separate display device.

34. The system according to claim 33, wherein the separate display device comprises a wireless member for detecting movement and position using any of: ultrasonic sound, infra red light, visible light.

35. The system according to claim 27, wherein the portable computing device is arranged with a portable display member.

36. The system according to claim 27, wherein the portable computing device is arranged with an operating system.

37. The system according to claim 35, wherein the portable computing device is arranged with a directional input member comprising any from a list of: button, joystick, ball, mouse, stylus, touch surface, elastic directional input member.

38. The system according to claim 26, wherein the portable computing device is arranged such that the portable computer device may be connected to the system or otherwise or activated in a way that is hot-pluggable, and without pausing or shutting down a control system.

39. The system according to claim 26, further comprising:
one or more computer program products comprising a non-transitory computer readable medium; and
computer program instructions recorded on the computer readable medium and executable by a computer or processor will cause the computer or processor to carry out a method to retrieve and display technical data for an industrial device comprising
selecting utilizing a graphical user interface on a first computing device operated by a user a representation of the industrial device, wherein the first computing device is operatively connected via a data network to the industrial device to control the industrial device,
recognizing the first computing device in a vicinity of a separate display member separate from the first computing device and making a connection via the data network between the first computing device and the separate display member,
transmitting a reference corresponding to the representation of the industrial device from the first computing device via the data network to the separate display member,
displaying on the separate display member a graphical user interface related to the industrial device,
operatively linking the separate display member to the industrial device via the data network, such that the graphical user interface displayed on the separate display member is manipulateable to carry out at least one of retrieving, displaying or manipulating the technical data for the industrial device or controlling the industrial device, and
manipulating the graphical user interface displayed by the separate display member to carry out at least one of retrieving, displaying or manipulating the technical data for the industrial device or controlling the industrial device.

40. The system according to claim 26, wherein the separate display device comprises any device from a list of: display screen, back display screen, back projection system, back-of-screen image display member, optical projector, whiteboard, television, computer monitor, computer terminal, workstation, touch-sensitive screen, LCD display, plasma panel.

41. The system according to claim 40, wherein the separate display device comprises a notebook computer or other portable device.

42. A method to retrieve and display technical data for a selected industrial device in an industrial facility using a computer program for control and at least one first computing device running a control program at least in part, wherein said control program comprises a graphical user interface arranged capable of generating a signal to retrieve said technical data related to one or more industrial devices, the method comprising:
recognizing the at least one first computing device operated by a user in a vicinity of a separate display member separate from the at least one first computing device, wherein the separate display device is operatively connected to a network,
selecting utilizing a graphical user interface on said at least one first computing device a representation of the selected industrial device and marking the selected industrial device in a computer program for control running on said at least one first computing device,
operatively connecting the at least one first computing device to the selected industrial device to carry out at least one of retrieving, displaying or manipulating the technical data for the industrial device or controlling the industrial device,
retrieving technical data about the selected industrial device,
going to a place in the industrial facility where the separate display member,
approaching the separate display member, the at least one first computing device being recognized by a location detector combined with an identity associated with a logged-on user or a computing device of a user,
the user transmitting a reference for at least one of the one or more industrial devices to the separate display member for retrieval of technical information associated with the industrial device so referenced and display and/or manipulation on a graphical user interface of the separate display member, linking the separate display member with the selected industrial device through the network, detecting a movement of a user relative to a position on said graphical user interface of the separate display member, and providing an instruction or a control signal to the industrial device with the separate display device dependent on the detected movement and/or a position of the user relative to the separate display device.

43. The method according to claim 1, further comprising:
carrying out any from a list of: checking a status of the industrial device, engineering the industrial device, making a calculated change to a set point or control parameter for the industrial device, configuring an automation device, controlling an automation device, tuning a process, checking a process variable, teaching a robot, or editing a robot program.

44. A method to retrieve, display and manipulate technical data for an industrial device and control the industrial device, the method comprising:

selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device, recognizing the first computing device in a vicinity of a separate display member separate from the first computing device and making a connection via the data network between the first computing device and the separate display member, transmitting a reference corresponding to the representation of the industrial device from the first computing device via the data network to the separate display member, displaying on the separate display member a graphical user interface related to the industrial device, operatively linking the separate display member to the industrial device via the data network, such that the graphical user interface displayed on the separate display member is manipulateable to carry out at least one of retrieving, displaying or manipulating the technical data for the industrial device or controlling the industrial device, manipulating the graphical user interface displayed by the separate display member to carry out at least one of retrieving, displaying or manipulating the technical data for the industrial device or controlling the industrial device, and retrieving technical data for devices used in conjunction with from a list of: electricity generation, transmission, transformation and/or distribution.

45. A method to retrieve, display and manipulate technical data for an industrial device and control the industrial device, the method comprising:

selecting utilizing a graphical user interface on a first computing device operated by a user a representation of the industrial device, wherein the first computing device is operatively connected via a data network to the industrial device to carry out at least one of retrieving, displaying or manipulating the technical data for the industrial device or controlling the industrial device, recognizing the first computing device in a vicinity of a separate display member separate from the first computing device and making a connection via the data network between the first computing device and the separate display member, transmitting a reference corresponding to the representation of the industrial device from the first computing device via the data network to the separate display member, displaying on the separate display member a graphical user interface related to the industrial device, operatively linking the separate display member to the industrial device via the data network, such that the graphical user interface displayed on the separate display member is manipulateable to carry out at least one of retrieving, displaying or manipulating the technical data for the industrial device or controlling the industrial device, manipulating the graphical user interface displayed by the separate display member to carry out at least one of retrieving, displaying or manipulating the technical data for the industrial device or controlling the industrial device, and retrieving technical data for devices used in conjunction with from any a list of: industrial production; metal production; pulp and paper manufacture; automated industrial processes; oil and gas production, upstream or downstream processes; chemical industry equipment and processes, vehicle manufacturing, vehicle assembly.

* * * * *